No. 833,808. PATENTED OCT. 23, 1906.
W. TRUE.
WHIFFLETREE HOOK.
APPLICATION FILED NOV. 13, 1905.
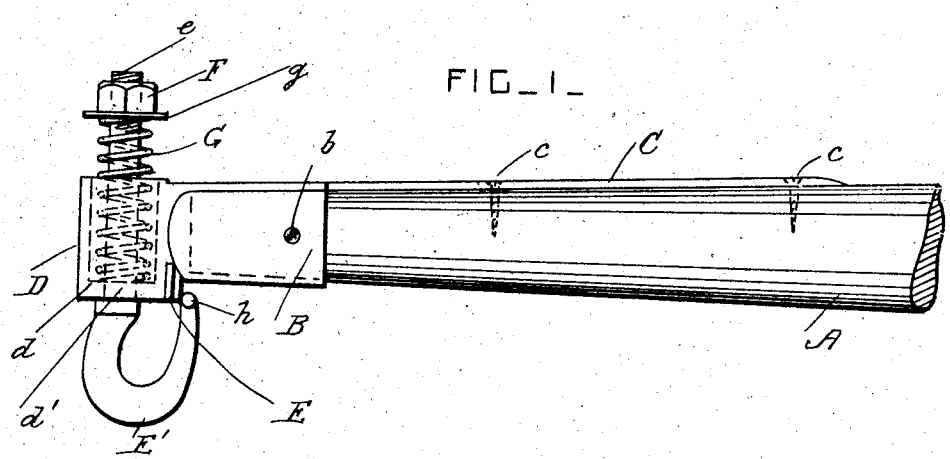
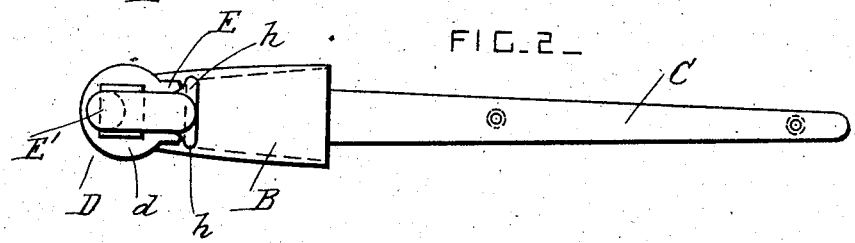
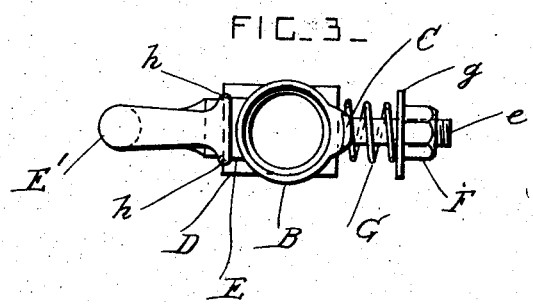
WITNESSES:
INVENTOR
William True.
BY Herbert W. Jenner.
Attorney

UNITED STATES PATENT OFFICE.

WILLIAM TRUE, OF FAIRFIELD, NEBRASKA, ASSIGNOR OF TWO-THIRDS TO JAMES H. HOLDEMAN, OF FAIRFIELD, NEBRASKA.

WHIFFLETREE-HOOK.

No. 833,808.  Specification of Letters Patent.  Patented Oct. 23, 1906.

Application filed November 13, 1905. Serial No. 287,072.

*To all whom it may concern:*

Be it known that I, WILLIAM TRUE, a citizen of the United States, residing at Fairfield, in the county of Clay and State of Nebraska, have invented certain new and useful Improvements in Whiffletree-Hooks; and I do hereby declare the following to be a full, clear, and exact description of the invention, such as will enable others skilled in the art to which it appertains to make and use the same.

This invention relates to hooks for whiffletrees and other similar draft devices; and it consists in the novel construction and combination of the parts hereinafter fully described and claimed.

In the drawings, Figure 1 is a side view of one end portion of a whiffletree provided with a socket and hook according to this invention. Fig. 2 is a plan view of the socket and hook. Fig. 3 is an end view of the socket and hook.

A is one end portion of a whiffletree or other similar draft device, such as a swingletree or doubletree.

B is a socket which fits over the extreme end portion of the whiffletree and which is secured to it by one or more screws $b$ or other approved fastening devices. The socket is preferably conical, and C is a narrow bar or blade which projects from one side of the socket and which is secured to the whiffletree by screws or other fastening devices $c$.

D is a spring-chamber formed crosswise of the socket and at its smaller end. One end portion of this spring-chamber is provided with an end $d$, having a guide-bolt $d'$, which is preferably rectangular. This end portion of the spring-chamber projects over the end of the socket, and E is a projecting lug on the spring-chamber next to the said socket.

E' is a hook provided with a shank which is slidable in the guide-hole $d'$. A nut F is screwed on the end of the shank $e$, and G is a spring arranged in the spring-chamber between the end $d$ and the nut. A washer $g$ is arranged between the spring and the nut; but this washer may be dispensed with if the nut is sufficiently large to afford a good bearing for the end of the spring. The point of the hook is provided with lateral projections $h$, and the point of the hook and its said projections are normally held in contact with the lug E, so that it is impossible for the chain to become disengaged from the hook when the parts are in the position shown in the drawings.

When the load is being drawn along, the spring allows the shank of the hook to slide to a limited extent in the spring-chamber, and the hook can be moved by hand to place the chain in engagement with it. The lateral projections on the point of the hook also prevent the chain from slipping, and they afford an extensive surface for engaging with the edge of the lug. The narrow blade is arranged on the opposite side of the socket from the hook and renders the connection of the socket with the whiffletree very strong and firm and enables a short socket to be used.

What I claim is—

1. The combination, with a socket for engaging with the end of a whiffletree and having a projecting blade at one side of it, of means for securing the said parts to the whiffletree, and a spring-supported hook slidable in a guide crosswise of the said socket and projecting on the opposite side of the socket from the said blade.

2. The combination, with a socket for engaging with the end of a whiffletree, said socket having a spring-chamber arranged crosswise at one end of it and provided with a projecting lug adjacent to the said socket, of a hook provided with a shank which is slidable in the said spring-chamber, said hook having also lateral projections at its point, and a spring arranged in the said spring-chamber and operatively connected with the shank of the hook and normally holding the point of the hook and its said projections in engagement with the said lug.

3. The combination, with a socket for engaging with the end of a whiffletree, said socket having a spring-chamber arranged crosswise at one end of it and provided with an end having a guide-hole, of a hook provided with a shank which is slidable in the said guide-hole and which projects through the said spring-chamber, a nut on the end of the said shank, and a spring arranged in the said chamber between its said end and the said nut and normally holding the point of the hook in contact with the said end of the chamber.

In testimony whereof I have affixed my signature in the presence of two witnesses.

WILLIAM TRUE.

Witnesses:
    JAS. M. LOVELL,
    D. F. FISHER.